United States Patent
Oomori

(10) Patent No.: US 10,302,134 B2
(45) Date of Patent: May 28, 2019

(54) BEARING STRUCTURE AND MOTOR

(71) Applicant: ASMO CO., LTD., Shizuoka-ken (JP)

(72) Inventor: Shingo Oomori, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 421 days.

(21) Appl. No.: 15/066,665

(22) Filed: Mar. 10, 2016

(65) Prior Publication Data
US 2016/0273590 A1 Sep. 22, 2016

(30) Foreign Application Priority Data

Mar. 17, 2015 (JP) .................................. 2015-053174

(51) Int. Cl.
| | |
|---|---|
| *F16C 35/02* | (2006.01) |
| *F16C 17/02* | (2006.01) |
| *F16H 57/021* | (2012.01) |
| *F16H 1/16* | (2006.01) |

(52) U.S. Cl.
CPC .............. *F16C 35/02* (2013.01); *F16C 17/02* (2013.01); *F16H 57/021* (2013.01); *F16H 1/16* (2013.01); *F16H 2057/0213* (2013.01)

(58) Field of Classification Search
CPC ............................................. F16H 2057/0213
See application file for complete search history.

(56) References Cited

U.S. PATENT DOCUMENTS

| | | | | |
|---|---|---|---|---|
| 3,170,739 | A * | 2/1965 | Lange ...................... | B60S 1/08 384/420 |
| 2002/0189386 | A1* | 12/2002 | Greubel .................... | F16H 1/16 74/425 |
| 2007/0012125 | A1* | 1/2007 | Viernekes ............. | F16H 57/021 74/89.14 |
| 2007/0186709 | A1* | 8/2007 | Schwendemann ..... | H02K 7/081 74/425 |
| 2011/0147113 | A1* | 6/2011 | Ko ........................ | B62D 5/0409 180/444 |

FOREIGN PATENT DOCUMENTS

| | | |
|---|---|---|
| JP | S51-86651 A | 7/1976 |
| JP | S54-105633 A | 8/1979 |
| JP | S58-69119 U | 5/1983 |

(Continued)

*Primary Examiner* — Terence Boes
(74) *Attorney, Agent, or Firm* — Patterson Thuente Pedersen, P.A.

(57) ABSTRACT

A bearing structure includes a bearing and a housing. The bearing rotationally supports a rotation shaft extending in an axial direction. The bearing includes an outer circumferential surface having an arcuate surface that projects outward in a radial direction from an axial end toward a middle portion of the axial direction. The housing includes a bearing accommodation recess that extends in the axial direction to accommodate and hold the bearing. The bearing accommodation recess includes an inner circumferential surface including a cylindrical portion and an abutment portion. The bearing is located at an inner side of the cylindrical portion. The abutment portion partially projects radially inward from the cylindrical portion. The arcuate surface of the bearing abuts against the abutment portion at least at three locations that are separated from one another in a rotation direction of the rotation shaft.

4 Claims, 8 Drawing Sheets

(56) References Cited

FOREIGN PATENT DOCUMENTS

| | | |
|---|---|---|
| JP | S63-159078 U | 10/1988 |
| JP | H 08251856 A | 9/1996 |
| JP | H 1118404 A | 1/1999 |
| JP | H 11164510 A | 6/1999 |
| JP | 2002-101601 A | 4/2002 |
| JP | 2007282335 A | 10/2007 |

* cited by examiner

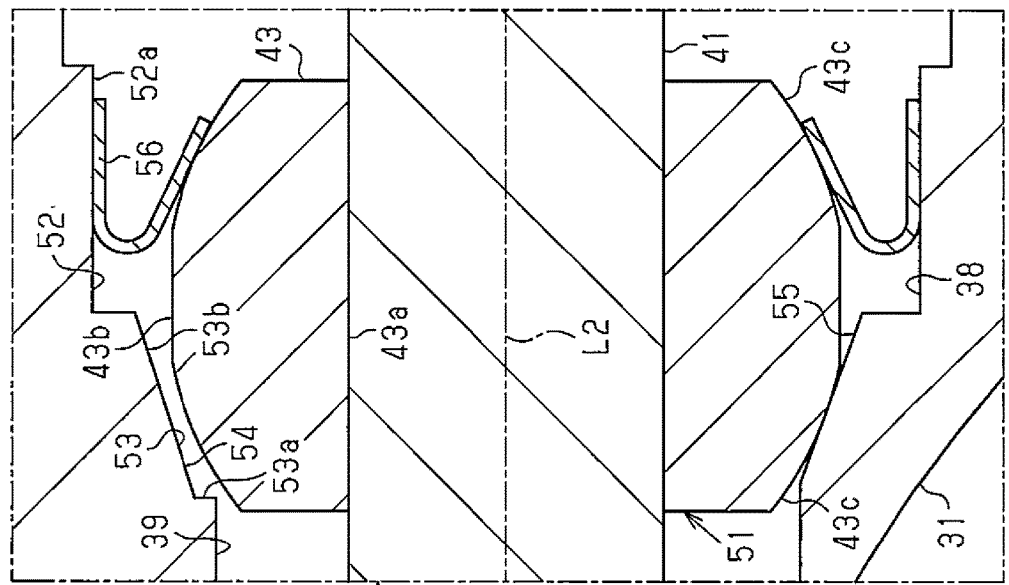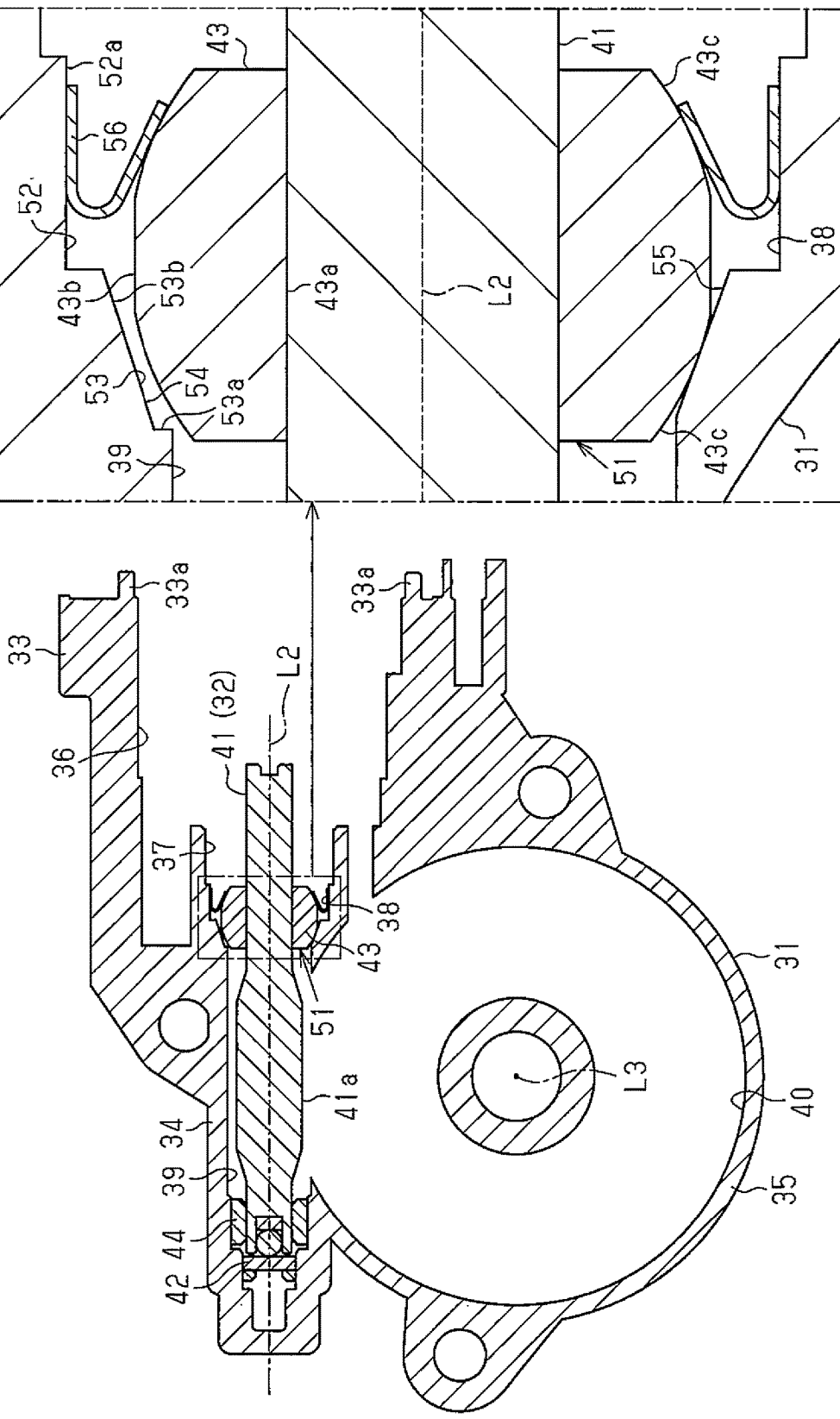

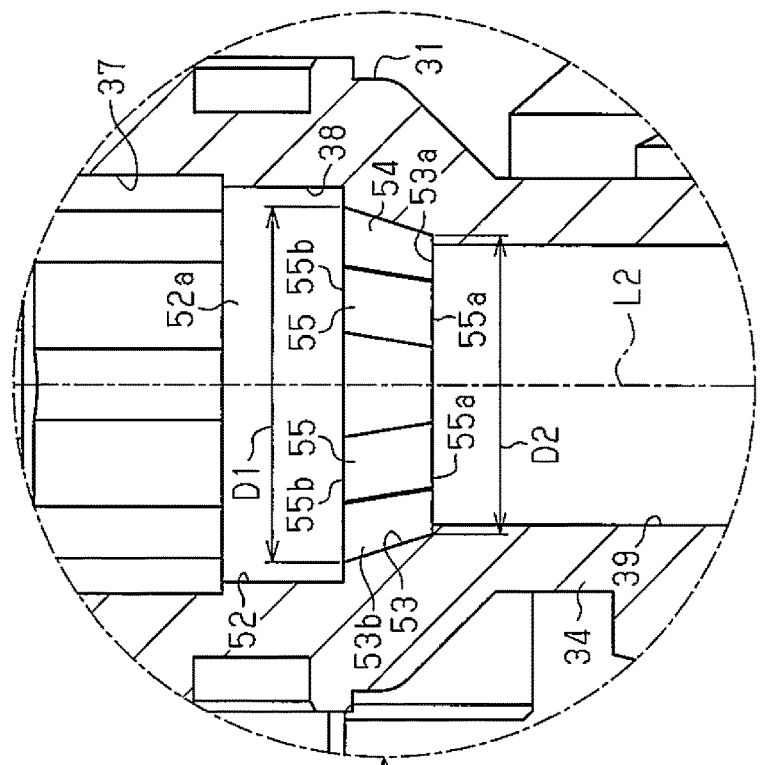
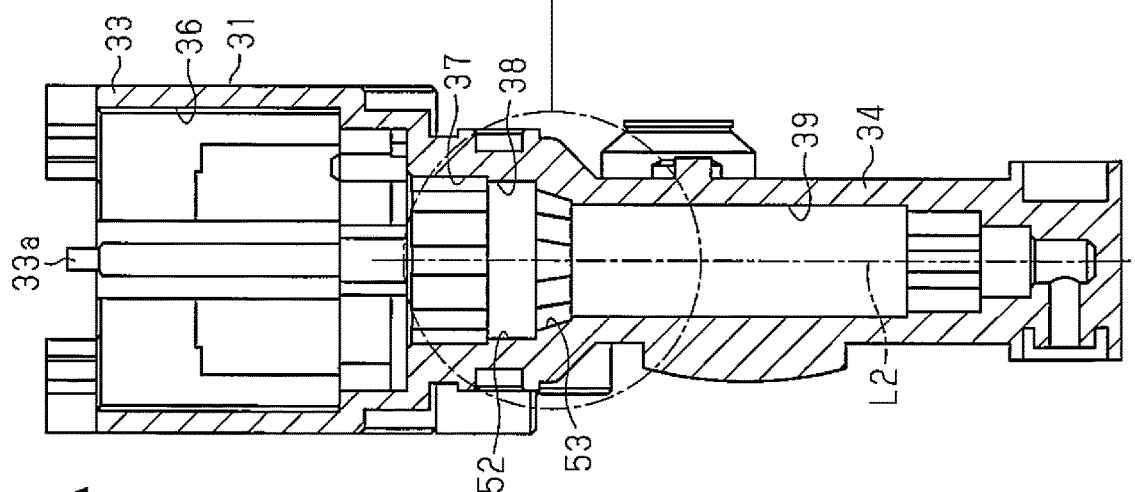

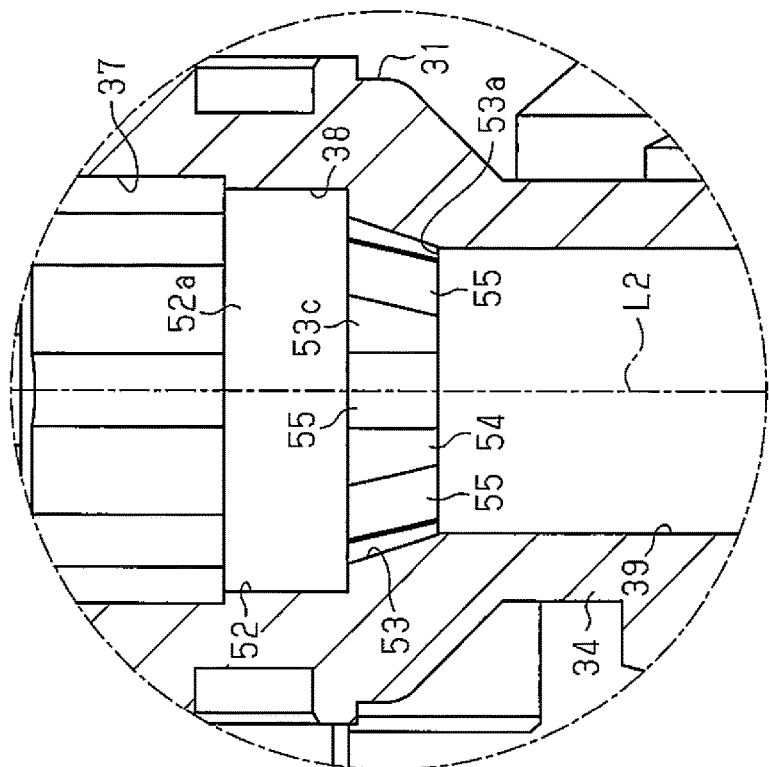
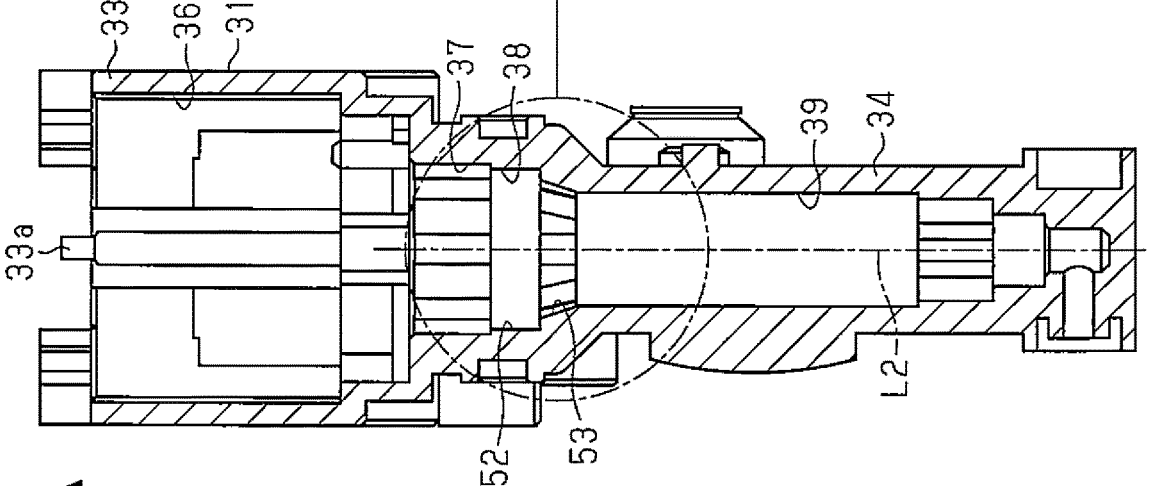

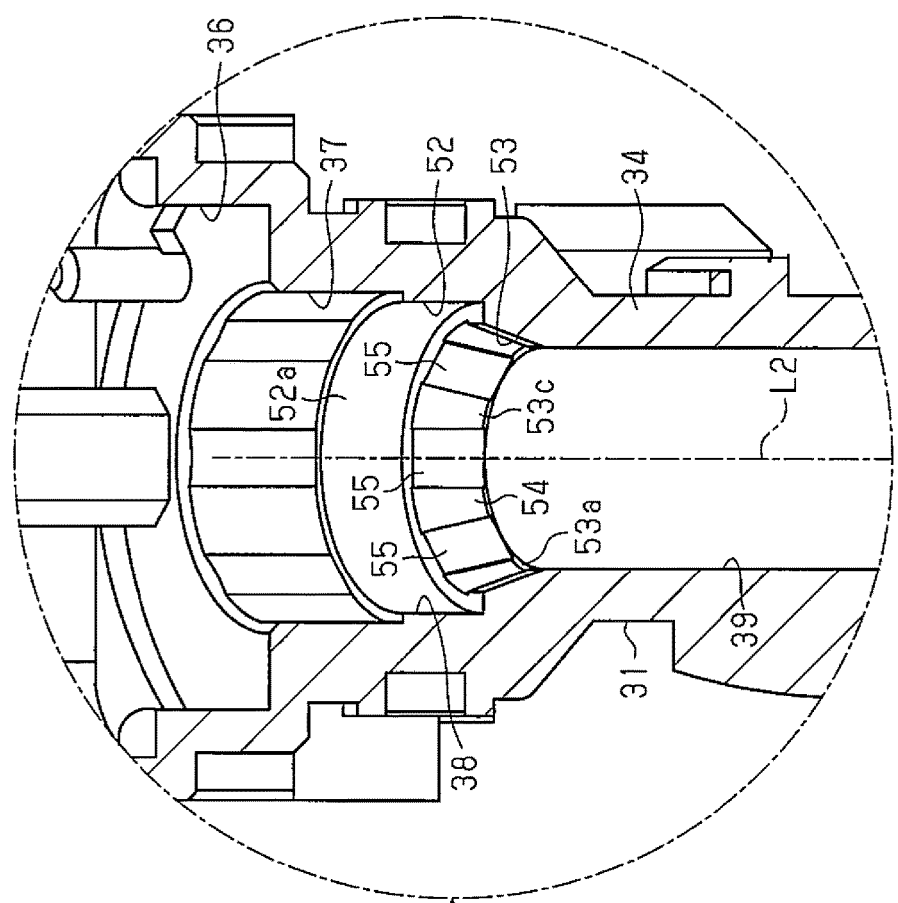
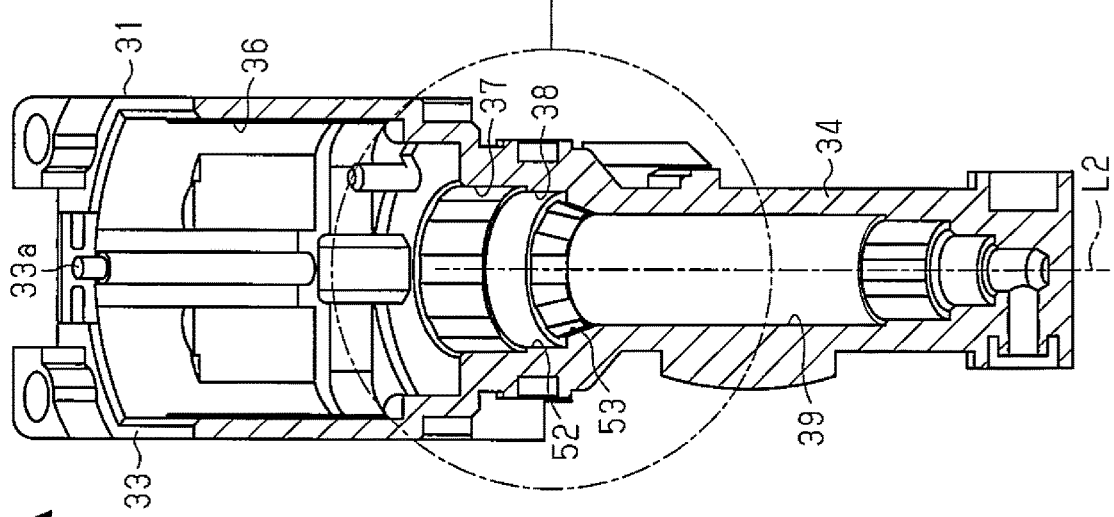

BEARING STRUCTURE AND MOTOR

BACKGROUND OF THE INVENTION

The present invention relates to a bearing structure and a motor.

Japanese Laid-Open Patent Publication No. 11-164510 discloses a motor that includes a bearing structure including a rotation shaft, a bearing that rotationally supports the rotation shaft, and a housing including a bearing accommodation recess that accommodates and holds the bearing. In the motor of the publication, the bearing of the motor includes an arcuate outer circumferential surface that bulges, or projects, outward in the radial direction from the axial ends toward the axially middle portion of the bearing. Further, the bearing accommodation recess includes an inner circumferential surface having a circular cross-section in a direction orthogonal to the axis of the bearing. The arcuate surface of the bearing is located in a portion of the bearing that is close to a bottom end of the bearing accommodation recess. The bearing is held in the bearing accommodation recess so that the arcuate surface of the bearing abuts against the inner circumferential surface of the bearing accommodation recess over the entire circumference.

However, in the above bearing structure, when the inner circumferential surface of the bearing accommodation recess has a large roundness error, the inner circumferential surface of the bearing accommodation recess contacts the arcuate surface of the bearing at fewer points, and the inner circumferential surface of the bearing accommodation recess may contact the arcuate surface of the bearing at three points. In addition, the inner circumferential surface of the bearing accommodation recess does not contact the arcuate surface of the bearing at the fixed locations. In such a case, the position of the bearing relative to the bearing accommodation recess varies between motors. This displaces the rotation shaft, which is supported by the bearing. Thus, the rotation axis of the rotation shaft may be located at different positions in different motors.

SUMMARY OF THE INVENTION

It is an object of the present invention to provide a bearing structure and a motor that reduces differences in the location of the rotation shaft axis.

To achieve the above object, a bearing structure according to one aspect of the present invention includes a bearing and a housing. The bearing rotationally supports a rotation shaft extending in an axial direction. The bearing includes an outer circumferential surface having an arcuate surface that projects outward in a radial direction from an axial end toward a middle portion of the axial direction. The housing includes a bearing accommodation recess that extends in the axial direction to accommodate and hold the bearing. The bearing accommodation recess includes an inner circumferential surface including a cylindrical portion and an abutment portion. The bearing is located at an inner side of the cylindrical portion. The abutment portion partially projects radially inward from the cylindrical portion. The arcuate surface of the bearing abuts against the abutment portion at least at three locations that are separated from one another in a rotation direction of the rotation shaft.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 2A and 2B are end views showing a gear housing of FIG. 1 that accommodates a worm shaft;

FIGS. 3A and 3B are cross-sectional views showing the gear housing of FIG. 1 taken along line 3A-3A in FIG. 4A;

FIGS. 6A and 6B are cross-sectional views showing a gear housing of another embodiment taken along line 6A-6A in FIG. 7A;

FIGS. 8A and 8B are cross-sectional views showing the gear housing of FIG. 6A.

DETAILED DESCRIPTION OF THE PREFERRED EMBODIMENTS

One embodiment of a motor including a bearing structure will now be described.

Figure 1:
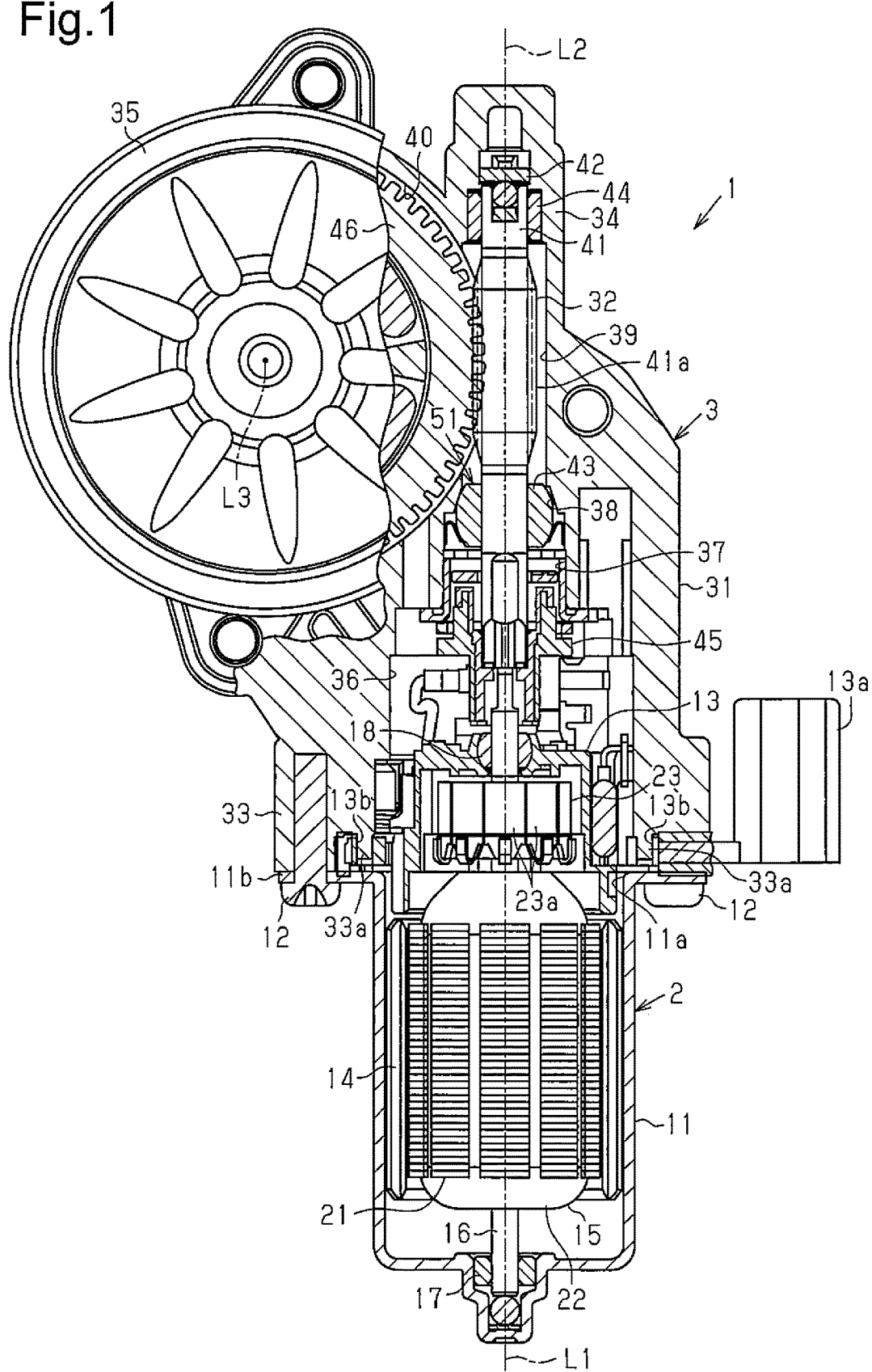
FIG. 1 is a partial cross-sectional view showing a motor according to one embodiment of the present invention.

A motor 1 of the present embodiment shown in FIG. 1 is a geared motor and includes a motor body 2 and a reduction drive 3. The reduction drive 3 reduces the speed of rotation produced by the motor body 2 and increases the output torque.

The motor body 2 includes a yoke housing 11 (hereinafter referred to as yoke 11), which is formed from a conductive metal material. The yoke 11 is tubular and has a closed end. The yoke 11 includes an open end 11a. The open end 11a includes a flange 11b, which extends toward the outer side from the yoke 11. Bolts 12 couple and fix the flange 11b to a fixing portion 33 of a gear housing (housing) 31, which forms the shell of the reduction drive 3.

Further, a brush holder 13, which is formed from an insulating material such as synthetic resin, is coupled to the open end 11a of the yoke 11 to close the open end 11a. When the yoke 11 is coupled and fixed to the gear housing 31 by the bolts 12, the brush holder 13 is held and fixed between the flange 11b and the fixing portion 33.

Magnets 14 are opposed to each other and fixed to the inner surface of the yoke 11. A rotor 15 is rotationally arranged at the inner sides of the magnets 14. A basal end (lower end as viewed in FIG. 1) of a drive shaft (rotation shaft) 16 of the rotor 15 is rotationally supported by a bearing 17, which is located in the central portion of the bottom of the yoke 11. A bearing 18, which is coupled to the central portion of the brush holder 13, rotationally supports the distal side of the drive shaft 16 (portion close to distal end, or upper end, of drive shaft 16 as viewed in FIG. 1). The distal end of the drive shaft 16 extends through the brush holder 13 in the axial direction and projects into the gear housing 31.

An armature core 21, which opposes the magnets 14 in the radial direction, is fixed to the drive shaft 16 so that the armature core 21 is rotatable integrally with the drive shaft 16. Coils 22 are wound around the armature core 21. In addition, a commutator 23 is fixed to the drive shaft 16 between the portion where the armature core 21 is fixed and the portion supported by the bearing 18 so that the commutator 23 is rotatable integrally with the drive shaft 16. Segments 23a are arranged on the outer circumferential surface of the commutator 23 in the circumferential direction. All or some of the segments 23a are electrically connected to the coil 22.

The brush holder 13 holds a power supplying brush (not shown), which slides in contact with the segments 23a of the commutator 23. Further, the brush holder 13 includes a connector 13a, to which an external connector (not shown) is connected. Current is supplied from the external connector to the power supplying brush through terminals (not shown) of the connector 13a.

The brush holder 13 includes positioning holes 13b opposing the flange 11b of the yoke 11 in the direction of the rotation axis L1 of the drive shaft 16. The positioning holes 13b are used to position the brush holder 13 and the gear housing 31. Each positioning hole 13b extends through the brush holder 13 in the direction of the rotation axis L1 of the drive shaft 16.

The reduction drive 3 includes the gear housing 31 and a reduction unit 32, which is accommodated in the gear housing 31. In the gear housing 31, positioning projections 33a are arranged on the fixing portion 33, which is coupled to the yoke 11, at locations corresponding to the positioning holes 13b of the brush holder 13. The positioning projections 33a project from the fixing portion 33 toward the yoke 11 in the direction of the rotation axis L1 of the drive shaft 16. When the yoke 11 and the gear housing 31 are coupled and fixed to each other by the bolts 12, the positioning projections 33a are inserted into the corresponding positioning holes 13b to position the brush holder 13 and the gear housing 31 in the rotation direction of the drive shaft 16 and in the radial direction of the drive shaft 16.

The gear housing 31 includes a worm shaft accommodation portion 34 and a wheel accommodation portion 35. The worm shaft accommodation portion 34 extends from the fixing portion 33 toward the side opposite to the yoke 11 in the direction of the rotation axis L1 of the drive shaft 16. The wheel accommodation portion 35 is located beside the worm shaft accommodation portion 34 (left side as viewed in FIG. 1) and integrated with the worm shaft accommodation portion 34.

The gear housing 31 includes a connection recess 36, which extends from the fixing portion 33 to the worm shaft accommodation portion 34. The connection recess 36 extends from the end surface of the fixing portion 33 that opposes the yoke 11 in the direction of the rotation axis L1 of the drive shaft 16. The connection recess 36 opens toward the yoke 11. The connection recess 36 accommodates the distal side of the drive shaft 16, the commutator 23, and the portion of the brush holder 13 projecting toward the reduction drive 3 from the flange 11b.

The gear housing 31 includes a clutch accommodation recess 37, which extends from the central portion of the bottom of the connection recess 36 toward the side opposite to the yoke 11 in the direction of the rotation axis L1 of the drive shaft 16. Further, the gear housing 31 includes a bearing accommodation recess 38, which extends from the central portion of the bottom of the clutch accommodation recess 37 toward the side opposite to the yoke 11 in the direction of the rotation axis L1 of the drive shaft 16. In addition, the gear housing 31 includes a worm shaft accommodation recess 39, which extends from the bottom of the bearing accommodation recess 38 toward the side opposite to the yoke 11 in the direction of the rotation axis L1 of the drive shaft 16. The worm shaft accommodation recess 39 is located in the worm shaft accommodation portion 34. The wheel accommodation portion 35 includes a wheel accommodation recess 40, which is in communication with the worm shaft accommodation recess 39. The wheel accommodation recess 40 is in communication with the worm shaft accommodation recess 39 at the axially middle portion of the worm shaft accommodation recess 39.

The worm shaft accommodation recess 39 accommodates a worm shaft 41 (rotation shaft or driven shaft) so that the worm shaft 41 is coaxial with the drive shaft 16, that is, so that the rotation axis L1 of the drive shaft 16 is aligned with the rotation axis L2 of the worm shaft 41. Further, the worm shaft accommodation recess 39 accommodates a thrust-receiving plate 42, which receives the thrust load of the worm shaft 41. The thrust-receiving plate 42 opposes a distal end surface (upper end surface in FIG. 1) of the worm shaft 41 in the axial direction. A basal portion of the worm shaft 41 (portion close to basal end, or lower end, of worm shaft 41 as viewed in FIG. 1) is inserted into and rotationally supported by a bearing 43, which is accommodated in the bearing accommodation recess 38. Further, the distal end of the worm shaft 41 is rotationally supported by a bearing 44, which is arranged in the worm shaft accommodation recess 39 at a distal end (upper end as viewed in FIG. 1) of the worm shaft accommodation portion 34. The basal end of the worm shaft 41 extends through the bearing 43 into the connection recess 36. A clutch 45, which extends from the connection recess 36 to the clutch accommodation recess 37, couples the basal end of the worm shaft 41 to the distal end of the drive shaft 16. When the drive shaft 16 is rotated, the clutch 45 transmits rotation of the drive shaft 16 to the worm shaft 41. When the drive shaft 16 is not rotated, the clutch 45 restricts rotation of the worm shaft 41.

The worm shaft 41 includes a worm 41a, which is a gear in the form of a screw, between the portion supported by the bearing 43 and the portion supported by the bearing 44. A worm wheel 46, which is engaged with the worm portion 41a, is rotationally arranged in the wheel accommodation recess 40. The reduction unit 32 includes the worm wheel 46, which is circular, and the worm shaft 41. The radially central portion of the worm wheel 46 includes an output shaft (not shown), which extends in the direction of the rotation axis L3 of the worm wheel 46 and is rotatable integrally with the worm wheel 46. The output shaft projects out of the wheel accommodation portion 35 from one side in the direction of the rotation axis L3 of the worm wheel 46 (side extending away from plane of FIG. 1).

A bearing structure 51, which rotationally supports the worm shaft 41, will now be described in detail.

The bearing structure 51 includes the bearing 43, which rotationally supports the inserted worm shaft 41, and the portion of the gear housing 31 that includes the bearing accommodation recess 38, which accommodates and holds the bearing 43.

As shown in FIGS. 2A and 2B, the bearing 43 is tubular and includes an inner circumferential surface 43a, which has substantially the same diameter as the outer diameter of the basal portion of the worm shaft 41. The outer circumferential surface 43b of the bearing 43 includes arcuate surfaces 43c at the two axial ends. Each arcuate surface 43c bulges, or projects, radially outward from the axial end of the bearing 43 toward the axially middle portion of the bearing 43. Further, each arcuate surface 43c extends over the entire circumference of the bearing 43 to form an annular shape. The portion in the outer circumferential surface 43b of the bearing 43 located between the two arcuate surfaces 43c in the axial direction is cylindrical and has a fixed diameter.

As shown in FIGS. 3A and 3B, the bearing accommodation recess 38 includes a first accommodation recess 52, which extends from the central portion of the bottom of the clutch accommodation recess 37, and a second accommodation recess 53, which extends from the central portion of the bottom of the first accommodation recess 52. The first accommodation recess 52 extends from the central portion of the bottom of the clutch accommodation recess 37 toward the distal end of the worm shaft accommodation portion 34 in the direction of the rotation axis L2 of the worm shaft 41 (same as direction of rotation axis L1 of drive shaft 16). The second accommodation recess 53 extends from the central portion of the bottom of the first accommodation recess 52 to the worm shaft accommodation recess 39 in the direction of the rotation axis L2. The worm shaft accommodation recess 39 extends from the bottom of the second accommodation recess 53 in the direction of the rotation axis L2 of the worm shaft 41. The second accommodation recess 53 connects the first accommodation recess 52 to the worm shaft accommodation recess 39.

Figure 4B:
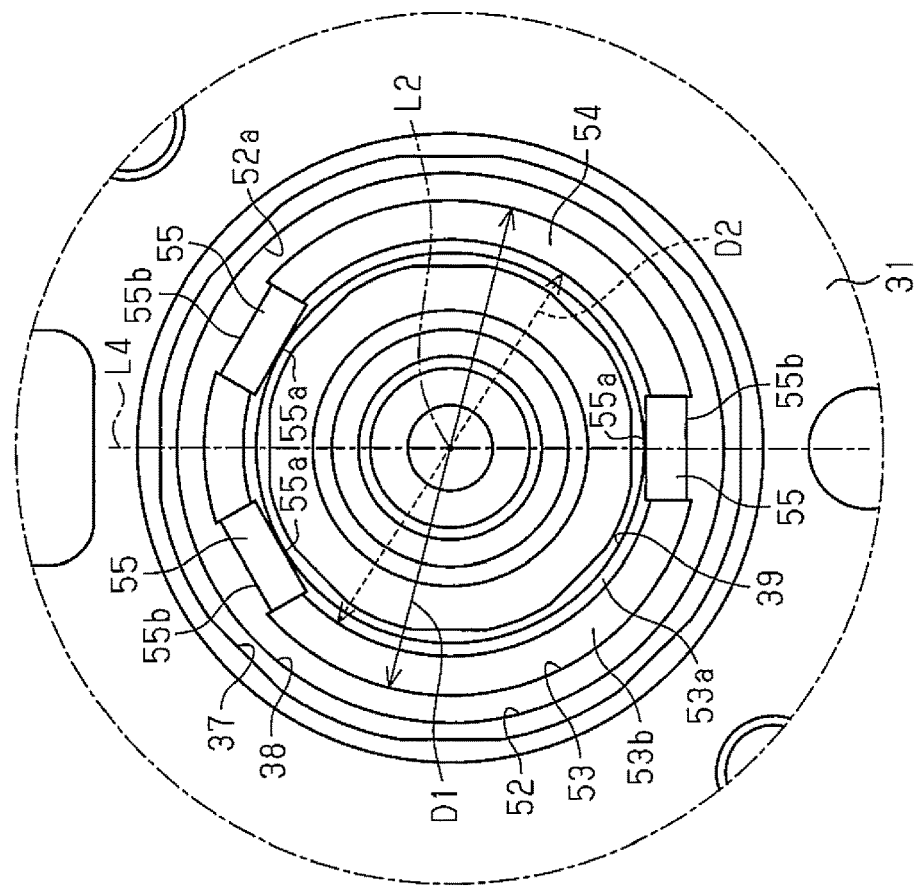
FIG. 4B is a partially enlarged view of FIG. 4A.
Figure 4A:
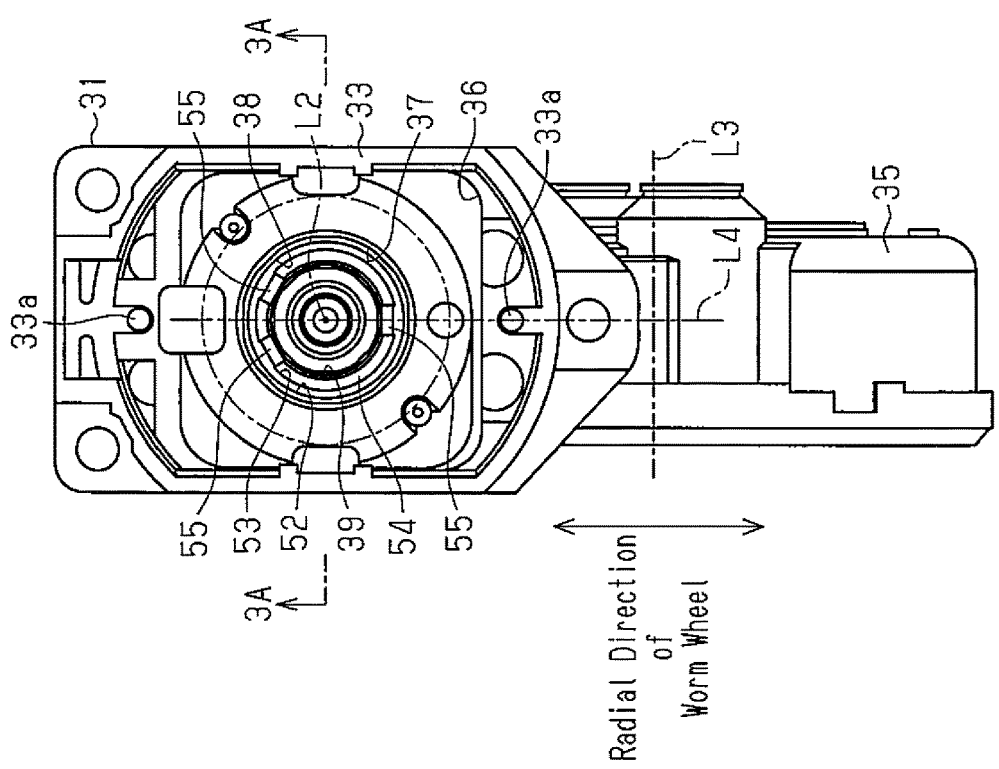
FIG. 4A is a front view of the gear housing shown in FIG. 1.

As shown in FIGS. 4A and 4B, the first accommodation recess 52 is circular as viewed in the direction of the rotation axis L2 of the worm shaft 41. As shown in FIG. 2B, the inner circumferential surface 52a of the first accommodation recess 52 is cylindrical and has a larger inner diameter than the outer diameter of the bearing 43. The depth of the first accommodation recess 52 (length in direction of rotation axis L2 of worm shaft 41) is slightly larger than one half of the axial length of the bearing 43.

As shown in FIG. 4B, the second accommodation recess 53 is circular as viewed in the direction of the rotation axis L2 of the worm shaft 41. As shown in FIGS. 3B and 4B, the inner diameter of the second accommodation recess 53 decreases from the opening of the second accommodation recess 53 toward a bottom surface 53a of the second accommodation recess 53. The second accommodation recess 53 includes an inner circumferential surface 53b, which includes a cylindrical portion 54 and a plurality of (three in the present embodiment) abutment portions 55.

Figure 5B:
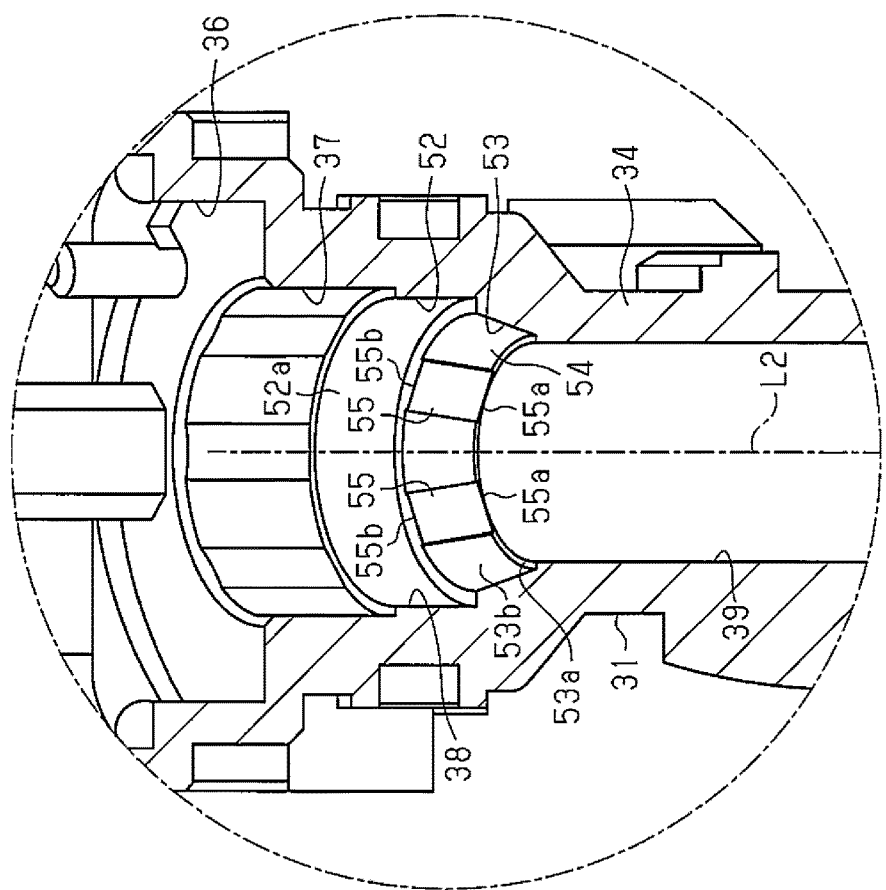
FIGS. 5A and 5B are cross-sectional views showing the gear housing of FIG. 1.
Figure 5A:
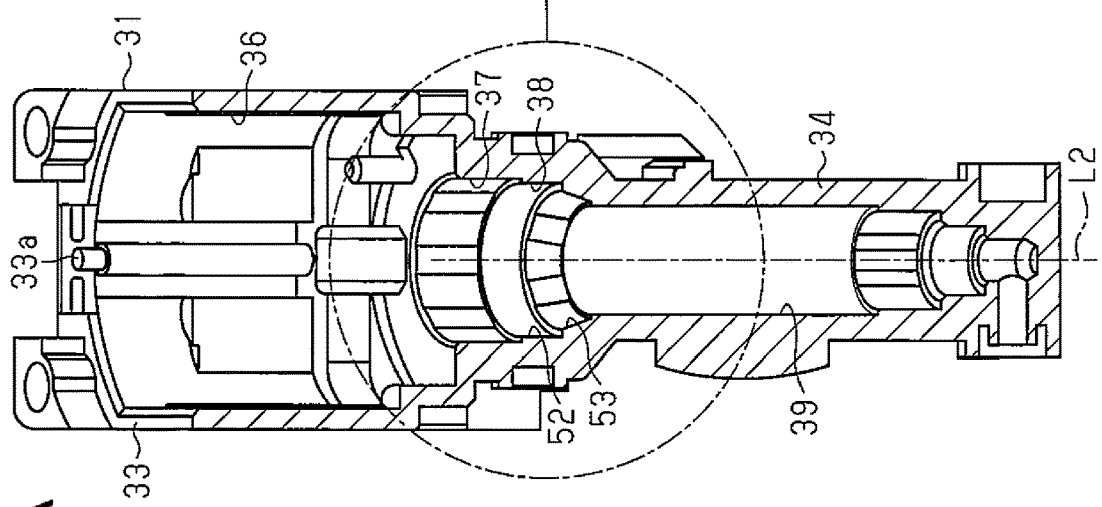
Figure 7A:
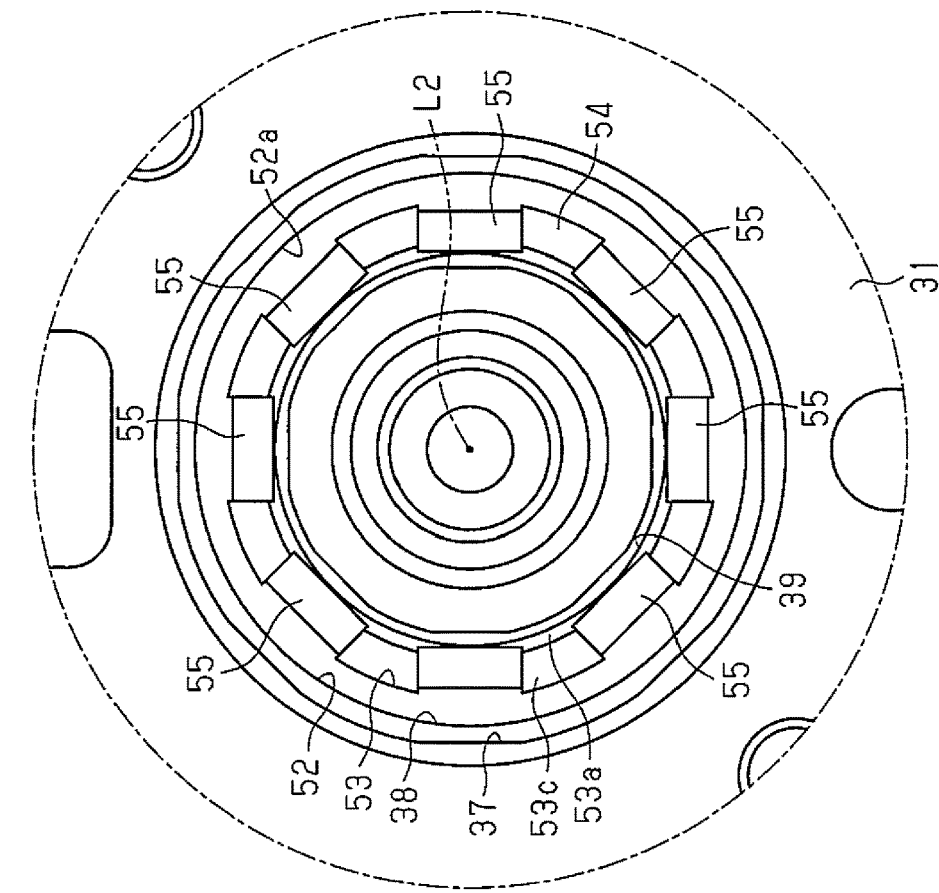
FIG. 7A is a front view of a gear housing shown in FIG. 6A.
Figure 7B:
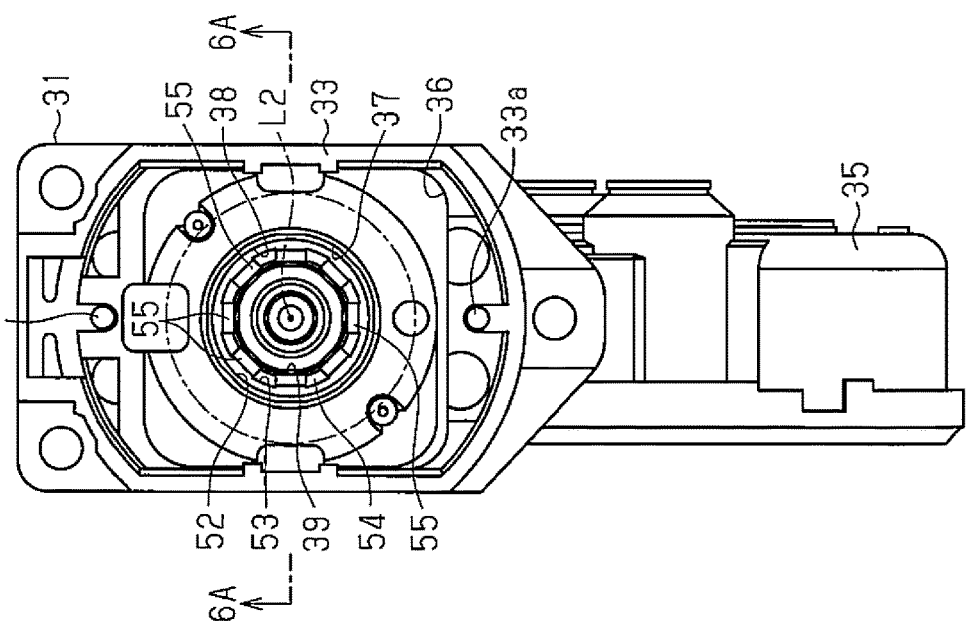
FIG. 7B is a partially enlarged view of FIG. 7A.

The cylindrical portion 54 is cylindrical and extends in the direction of the rotation axis L2 of the worm shaft 41. The cylindrical portion 54 of the present embodiment is inclined so that the inner diameter of the cylindrical portion 54 decreases from the opening of the bearing accommodation recess 38 toward the bottom of the bearing accommodation recess 38, more specifically, from the opening of the second accommodation recess 53 toward the bottom surface 53a. The cylindrical portion 54, which has the form of a truncated cone, extends from the opening of the second accommodation recess 53 to the bottom surface 53a of the second accommodation recess 53 in the direction of the rotation axis L2 of the worm shaft 41. As shown in FIGS. 2B, 3B, and 4B, the inner diameter D1 of the cylindrical portion 54 is larger than the outer diameter of the bearing 43 at the axial end of the cylindrical portion 54 that is close to the opening of the second accommodation recess 53. The inner diameter D2 of the cylindrical portion 54 is smaller than the outer diameter of the bearing 43 at the axial end of the cylindrical portion 54 that is close to the bottom surface 53a of the second accommodation recess 53. As shown in FIGS. 5A and 5B, the axial end of the cylindrical portion 54 that is close to the bottom surface 53a of the second accommodation recess 53 is located on the outer edge of the bottom surface 53a.

As shown in FIG. 4B, the three abutment portions 55 are located at three locations in the second accommodation recess 53 and separated from each other in the rotation direction (circumferential direction) of the worm shaft 41. The three abutment portions 55 are formed to divide the cylindrical portion 54 in the circumferential direction. Two of the three abutment portions 55 are located at the side of the rotation axis L2 of the worm shaft 41 opposite to the worm wheel 46 as viewed in the direction of the rotation axis L2 of the worm shaft 41. Further, these two abutment portions 55 are located at opposite sides of a reference line L4, which is shown in FIGS. 4A and 4B, and equally spaced apart from the reference line L4 as viewed in the direction of the rotation shaft L2 of the worm shaft 41. The reference line L4 extends parallel to the radial direction of the worm wheel 46 and orthogonal to the rotation axis L2 of the worm shaft 41. In the present embodiment, the two abutment portions 55 are symmetrical with respect to the reference line L4 as viewed in the direction of the rotation axis L2 of the worm shaft 41. The remaining abutment portion 55 is located on the reference line L4 between the rotation axis L2 of the worm shaft 41 and the rotation axis L3 of the worm wheel 46 as viewed in the direction of the rotation axis L2 of the worm shaft 41. That is, the middle of the two abutment portions 55, which are located at the side of the rotation axis L2 of the worm shaft 41 opposite to the worm wheel 46, and the remaining abutment portion 55, which is located between the rotation axis L2 of the worm shaft 41 and the rotation axis L3 of the worm wheel 46, are opposed to each other in the radial direction of the second accommodation recess 53. Further, the cylindrical portion 54 is located at opposite sides of each abutment portion 55 in the circumferential direction (rotation direction of worm shaft 41), and each abutment portion 55 is adjacent to the cylindrical portion 54 in the circumferential direction.

As shown in FIGS. 4B and 5B, the three abutment portions 55 are identical in shape. Each abutment portion 55 has a flat surface inclined to project toward the radially inner side from the opening of the bearing accommodation recess 38 toward the bottom of the bearing accommodation recess 38, that is, from the opening of the second accommodation recess 53 toward the bottom surface 53a. Each abutment portion 55 is rectangular. Each abutment portion 55 includes sides 55a and 55b defined by the two ends in the direction that the rotation axis L2 of the worm shaft 41 extends. The sides 55a and 55b of the abutment portions 55 extend so that the sides 55a and 55b are each orthogonal to the radial direction of the second accommodation recess 53 at the middle of the sides 55a and 55b in the circumferential direction of the second accommodation recess 53 (the same as the rotation direction of worm shaft 41) as viewed from the rotation axis L2 of the worm shaft 41.

The middle of the side 55a that is close to the bottom surface 53a of the second accommodation recess 53 is located on the inner rim of the bottom surface 53a. The side 55b that is close to the opening of the second accommodation recess 53 is located at the radially inner side of the cylindrical portion 54 in the opening of the second accommodation recess 53. Thus, each abutment portion 55 is entirely projected radially inward from the cylindrical portion 54.

As shown in FIG. 2B, the bearing 43 is inserted into the bearing accommodation recess 38 so that the axial direction of the bearing accommodation recess 38 corresponds to the axial direction of the bearing 43. One axial end of the bearing 43 is located in the second accommodation recess 53 (i.e., inner side of cylindrical portion 54), and the other axial end of the bearing 43 is located in the first accommodation recess 52. As shown in FIGS. 2B and 4B, the three abutment portions 55 abut against the bottom-side arcuate surface 43c (arcuate surface 43c that is close to the bottom surface 53a of the second accommodation recess 53). More specifically, the abutment portions 55 are located at three locations separated from each other in the rotation direction of the worm shaft 41. Thus, the bottom side arcuate surface 43c abuts against the abutment portions 55 at the three locations separated in the rotation direction of the worm shaft 41. The three abutment portions 55 support the bearing 43.

A holding spring 56 is arranged between the open end side arcuate surface 43c (arcuate surface 43c of bearing 43 that is close to the opening of the first accommodation recess 52) and the inner circumferential surface 52a of the first accommodation recess 52. The holding spring 56 biases the bearing 43 toward the bottom surface 53a of the second accommodation recess 53 and restrict separation of the bearing 43 from the bearing accommodation recess 38.

The operation of the present embodiment will now be described.

Referring to FIG. 1, in the motor 1, when current is supplied from the external connector, which is connected to the connector 13a, to the rotor 15 through the terminals and the power supplying brush, the rotor generates a rotating magnetic field that drives and rotates the rotor 15 (drive shaft 16). Rotation of the drive shaft 16 is transmitted to the worm shaft 41 through the clutch 45. The rotation transmitted to the worm shaft 41 is reduced in speed by the worm shaft 41 and the worm wheel 46 and then output from the output shaft.

As shown in FIGS. 2B and 4B, the bearing structure 51 of the motor 1 includes the abutment portions 55 that are projected radially inward from the cylindrical portion 54 at the three locations that are separated in the rotation direction of the worm shaft 41. The three abutment portions 55 positively abut against the bottom side arcuate surface 43c.

In the motor 1, the distal portion of the drive shaft 16 is supported by the bearing 18, which is held by the brush holder 13. The worm shaft 41 is supported by the bearings 43 and 44, which are held by the gear housing 31. Thus, the positioning projections 33a of the gear housing 31 are inserted into the positioning holes 13b of the brush holder 13 to align the drive shaft 16 and the worm shaft 41.

The present embodiment has the advantages described below.

(1) The abutment portions 55 project radially inward from the cylindrical portion 54. Thus, the abutment portions 55 easily abut against the bottom side arcuate surface 43c. The bottom side arcuate surface 43c abuts against the abutment portions 55 at the three locations that are separated from each other in the rotation direction of the worm shaft 41. Since the inner circumferential surface of the bearing accommodation recess 38 easily abuts against the bottom side arcuate surface 43c at fixed locations, differences are reduced in the position of the bearing 43 relative to the bearing accommodation recess 38. Accordingly, even if the cylindrical portion 54 has a large roundness error, differences are reduced in the position of the rotation axis L2 of the worm shaft 41, which is rotationally supported by the bearing 43.

(2) Each abutment portion 55 is inclined to project radially inward from the opening of the bearing accommodation recess 38 toward the bottom of the bearing accommodation recess 38, that is, from the opening of the second accommodation recess 53 toward the bottom surface 53a. This allows the position of the bearing 43 to be easily changed in the bearing accommodation recess 38 and allows for easy alignment of the bearing 43. Further, the simple flat shape of each abutment portion 55 allows the bearing accommodation recess 38 to have a simple shape. This also facilitates molding of the gear housing 31, which includes the abutment portions 55, and machining for forming the abutment portions 55. Thus, the abutment portions 55 may be easily formed.

(3) The motor 1 includes two rotation shafts, namely, the drive shaft 16 and the worm shaft 41, to which rotation of the drive shaft 16 is transmitted. Such a motor requires the drive shaft 16 and the worm shaft 41 to be accurately aligned. In the present embodiment, the bearing structure 51 of the motor 1 effectively limits inclination of the rotation axis L2 of the worm shaft 41, which is supported by the bearing structure 51. This increases the alignment accuracy of the worm shaft 41.

(4) The worm shaft 41 receives, from the worm wheel 46, a pushing force in the radial direction of the worm wheel 46, that is, in the direction orthogonal to the rotation axis L2 of the worm shaft 41. The bearing 43, which rotationally supports the worm shaft 41, receives the same pushing force from the worm shaft 41. Two of the abutment portions 55 are located opposite to the worm wheel 46 with respect to the rotation axis L2 of the worm shaft 41 as viewed in the direction of the rotation axis L2 of the worm shaft 41. Further, the two abutment portions 55 are located at opposite sides of the reference line L4 and equally spaced apart from the reference line L4, which is parallel to the radial direction of the worm wheel 46 and orthogonal to the rotation axis L2 of the worm shaft 41. Thus, the inner circumferential surface 53b of the second accommodation recess 53 effectively supports the bearing 43, which receives the pushing force from the worm wheel 46, with the three abutment portions 55 including the above two abutment portions 55. Accordingly, the bearing 43 is stably held in the bearing accommodation recess 38 when the worm shaft 41 rotates while limiting misalignment of the bearing 43 relative to the bearing accommodation recess 38.

(5) The second accommodation recess 53 is formed so that the inner diameter of the second accommodation recess 53 decreases from the opening toward the bottom surface 53a. The cylindrical portion 54 that forms the inner circumferential surface 53b of the second accommodation recess 53 is inclined so that the inner diameter of the cylindrical portion 54 decreases from the opening of the second accommodation recess 53 toward the bottom surface 53a. Each of the abutment portions 55 that form the inner circumferential surface 53b of the second accommodation recess 53 with the cylindrical portion 54 has a flat surface inclined radially inward from the opening of the second accommodation recess 53 toward the bottom surface 53a. Accordingly, the position of the bearing 43 may be easily changed in the direction of the rotation axis L2 of the worm shaft 41 by changing the inclination angles of the cylindrical portion 54 and the abutment portions 55.

(6) The distal portion of the drive shaft 16 is supported by the bearing 18, which is held by the brush holder 13. The worm shaft 41 is supported by the bearings 43 and 44, which are held by the gear housing 31. Thus, insertion of the positioning projections 33a of the gear housing 31 into the positioning holes 13b of the brush holder 13 aligns the drive shaft 16 and the worm shaft 41. Accordingly, the positioning projections 33a need to be formed at accurate positions. A reference pin may be inserted into the bearing 43 and the worm shaft accommodation recess 39 to conduct a dimensional inspection that measures the positional accuracy of the positioning projections 33a. In the dimensional inspection, the positional accuracy of the positioning projections 33a is measured using the distance from the axis of the reference pin to each positioning projection 33a of the gear housing 31. The present embodiment limits misalignment of the bearing 43 relative to the bearing accommodation recess 38. This limits inclination of the axis of the reference pin relative to the axial direction in the gear housing 31. Accordingly, measurement errors that would result from the inclination of the reference pin are limited in the dimensional inspection that uses the reference pin. This reduces the number of modifications and inspections performed on a molding die that molds the gear housing and reduces the number of operations and the amount of time used to manufacture the molding die of the gear housing 31.

It should be apparent to those skilled in the art that the present invention may be embodied in many other specific forms without departing from the spirit or scope of the invention. Particularly, it should be understood that the present invention may be embodied in the following forms.

In the above embodiment, each abutment portion 55 has a flat surface inclined to project radially inward from the opening of the bearing accommodation recess 38 toward the bottom of the bearing accommodation recess 38. However, each abutment portion 55 does not have to have a flat surface as long as the abutment portion 55 includes the section that projects radially inward from the cylindrical portion 54. For example, the abutment portion 55 may be a curved surface that projects further radially inward as the axially middle portion becomes closer. In such a case, the entire abutment portion 55 in the axial direction may project radially inward from the cylindrical portion 54. Alternatively, only the axially middle portion of the abutment portion 55 may project radially inward from the cylindrical portion 54.

The number of the abutment portions 55 of the bearing accommodation recess 38 and the locations of the abutment portions 55 in the bearing accommodation recess 38 are not limited to the above description. The number of the abutment portions 55 may be one or more than one as long as the bottom side arcuate surface 43c abuts against the abutment portions 55 at least at three locations. When the bearing accommodation recess 38 includes a plurality of abutment portions 55, the abutment portions 55 may be shifted in the rotation direction of the worm shaft 41.

In the example shown in FIGS. 6A to 8B, the inner circumferential surface 53c of the second accommodation recess 53 includes the cylindrical portion 54 and eight abutment portions 55. The eight abutment portions 55 are located at equal intervals (45° in this example) in the rotation direction of the worm shaft 41. This allows the inner circumferential surface 53c of the second accommodation recess 53 to abut against the arcuate surface 43c of the bearing 43 at eight locations that are equally spaced in the rotation direction of the worm shaft 41. That is, the bearing accommodation recess 38 supports the arcuate surface 43c of the bearing 43 at the eight locations equally spaced in the rotation direction of the worm shaft 41. Thus, the bearing 43 receives a pushing force in the rotation axis L2 of the worm shaft 41 evenly at the eight locations where the arcuate surface 43c of the bearing 43 abuts against the inner circumferential surface 53c of the second accommodation recess 53. This further limits misalignment of the bearing 43 relative to the bearing accommodation recess 38. Accordingly, differences are further reduced in the position of the rotation axis L2 of the worm shaft 41. Further, when the gear housing 31 is formed from a synthetic resin, sink marks are reduced when molding the abutment portions.

In the above embodiment, the arcuate surface 43c of the bearing 43 abuts against each abutment portion 55 at a single location. However, the arcuate surface 43c may abut against each abutment portion 55 at a plurality of locations.

In the above embodiment, the arcuate surface 43c of the bearing 43 is annular and extends over the entire circumference of the bearing 43. However, the arcuate surface 43c of the bearing 43 does not have to be annular and extend over the entire circumference of the bearing 43 as long as the arcuate surface 43c abuts against the abutment portions 55.

In the above embodiment, the cylindrical portion 54 is inclined so that the inner diameter of the cylindrical portion 54 decreases from the opening of the bearing accommodation recess 38 toward the bottom of the bearing accommodation recess 38, that is, from the opening of the second accommodation recess 53 toward the bottom surface 53a. However, the cylindrical portion 54 does not have to be shaped in such a manner. The cylindrical portion 54 may have the form of a cylinder (including a form that is divided in the circumferential direction at the abutment portions 55) so that the bearing 43 is arranged in the cylindrical portion 54. In other words, the cylindrical portion 54 may be cylindrical to surround the outer circumference of the bearing 43 with the abutment portions 55. For example, the cylindrical portion 54 may be cylindrical (including a form divided in the circumferential direction at the abutment portions 55) and have a fixed inner diameter from the opening of the bearing accommodation recess 38 toward the bottom of the bearing accommodation recess 38.

The bearing structure 51 of the above embodiment may rotationally support at least one of the basal end of the drive shaft 16 (portion supported by bearing 17), the distal end portion of the drive shaft 16 (portion supported by bearing 18), and the distal end of the worm shaft 41 (portion supported by bearing 44). In such a case, the bearing accommodation recess 38, which accommodates and holds the bearing 43, does not have to include the abutment portions 55.

In the above embodiment, the drive shaft 16 and the worm shaft 41 are separated from each other and coupled by the clutch 45. However, the drive shaft 16 and the worm shaft 41 may be integrated with each other.

In the above embodiment, the motor 1 is a geared motor in which the reduction drive 3 is coupled to the motor body 2. However, the motor 1 does not have to include the reduction drive 3.

In the above embodiment, the motor 1 includes the bearing structure 51. However, the bearing structure 51 is applicable to a device other than the motor in which a rotation shaft is rotationally supported by a bearing accommodated in a bearing accommodation recess of a housing.

The present examples and embodiments are to be considered as illustrative and not restrictive, and the invention is not to be limited to the details given herein, but may be modified within the scope and equivalence of the appended claims.

The invention claimed is:

1. A motor comprising:
 a bearing structure including:
  a bearing that rotationally supports a rotation shaft extending in an axial direction, wherein the bearing includes an outer circumferential surface having an arcuate surface that projects outward in a radial direction from an axial end toward a middle portion of the axial direction; and a housing including a bearing accommodation recess that extends in the axial direction to accommodate and hold the bearing; and a worm shaft; and a worm wheel engaged with the worm shaft, wherein the bearing accommodation recess includes an inner circumferential surface including a cylindrical portion and an abutment portion, the bearing is located at an inner side of the cylindrical portion, the abutment portion partially projects radially inward from the cylindrical portion, the arcuate surface of the bearing abuts against the abutment portion at least at three locations that are separated from one another in a rotation direction of the rotation shaft, the bearing structure rotationally supports the worm shaft, the abutment portion is one of a plurality of abutment portions, the abutment portions are arranged at locations that are separated from each other in a rotation direction of the rotation shaft, two of the abutment portions are located at a side opposite to the worm wheel with respect to an axis of the worm shaft as viewed in an axial direction of the worm shaft, the two abutment portions are located at opposite sides of a reference line and equally spaced apart from the reference line, and the reference line extends in a direction that is parallel to a radial direction of the worm wheel and orthogonal to the axis of the worm shaft.

2. The motor according to claim 1, wherein the abutment portions are equally spaced in the rotation direction of the rotation shaft.

3. The motor according to claim 1, wherein the abutment portion has a flat surface inclined to project radially inward from an opening of the bearing accommodation recess toward a bottom of the bearing accommodation recess.

4. The motor according to claim 1 further comprising:

a drive shaft that is rotated; and a driven shaft to which rotation of the drive shaft is transmitted, wherein the driven shaft is arranged coaxially with the drive shaft, wherein at least one of the drive shaft and the driven shaft functions as the rotation shaft, and the bearing structure rotationally supports at least one of the drive shaft and the driven shaft.

\* \* \* \* \*